United States Patent [19]

Pappalardo et al.

[11] 4,307,321

[45] Dec. 22, 1981

[54] RED EMITTING PHOSPHOR WITH SLOW EXPONENTIAL DECAY

[75] Inventors: Romano G. Pappalardo, Sudbury; John Walsh, Milford, both of Mass.

[73] Assignee: GTE Laboratories Incorporated, Waltham, Mass.

[21] Appl. No.: 135,605

[22] Filed: Mar. 31, 1980

[51] Int. Cl.³ .................. H01J 61/44; C09K 11/08
[52] U.S. Cl. ..................... 313/486; 252/301.4 P; 252/301.6 P
[58] Field of Search .............. 313/486, 487; 252/301.4 P, 301.6 P

[56] References Cited

U.S. PATENT DOCUMENTS

| | | | |
|---|---|---|---|
| 2,619,471 | 11/1952 | Butler | 252/301.4 P |
| 2,774,738 | 12/1956 | Butler | 252/301.6 P |
| 2,786,034 | 3/1957 | Butler | 252/301.4 P |
| 3,396,118 | 8/1968 | Datta | 252/301.4 P |
| 3,609,094 | 9/1971 | Shaffer | 252/301.4 P |
| 3,836,477 | 9/1974 | Lages | 252/301.4 F |
| 4,174,294 | 11/1979 | Murakami et al. | 252/301.4 P |

OTHER PUBLICATIONS

Kroger, *A Proof of the Associated-Pair Theory for Sensitized Luminophors*, Physica, XV (8–9), Sep. 1949, p. 801-806.

Butler, *Alkaline Earth Orthophophate Phosphors*, J. Electrochem. Soc. 100, May 1953, pp. 250-255.

Koelmans et al. *Luminescence of Modified Tin-Activated Strontium Orthophsophate*, J. Electrochem Soc., 104, Jul. 1957, p. 442-445.

Sarver et al., *Phase Equilibria and Tin-Activated Luminescence in Strontium Orthophosphate Systems*, J. Electrochem. Soc. 108, Dec. 1961, pp. 1103-1110.

*Primary Examiner*—Eugene R. LaRoche
*Attorney, Agent, or Firm*—Jerry F. Janssen

[57] ABSTRACT

A luminescent phosphor composition having enhanced luminescent decay lifetime consists essentially of a non-stoichiometric cerium and manganese coactivated alkaline earth orthophosphate represented by the formula $$Sr_{(3-v-w-x-y-z)}\square_v Mg_w CA_x (PO_4)_2 : Ce_y Mn_z$$

where
$0.001 \leq v \leq 0.05$
$0.180 \leq w \leq 0.35$
$0 \leq x \leq 0.08$
$0.015 \leq y \leq 0.05$
$0.01 \leq z \leq 0.10$.

An improved fluorescent lamp employing the disclosed phosphor is also described.

11 Claims, 3 Drawing Figures

RED EMITTING PHOSPHOR WITH SLOW EXPONENTIAL DECAY

CROSS-REFERENCE TO RELATED APPLICATION

The subject matter of this application is related to the subject matter of application Ser. No. 135,951 filed concurrently herewith in the names of Romano G. Pappalardo and Charles F. Chenot, assigned to the assignee of the present invention.

BACKGROUND OF THE INVENTION

1. Field of the Invention

This invention relates to fluorescent phosphor materials. More particularly, it is concerned with non-stoichiometric modified strontium orthophosphate phosphors coactivated with cerium and manganese.

2. Discussion of the Prior Art

Fluorescent phosphor materials employing a matrix of calcium or strontium orthophosphate have been the subject of some study.

For example, Kröger in *Physica*, 15:801 (1949) discusses the fluorescence of unmodified calcium or strontium orthophosphate phosphors coactivated with tin and manganese or with cerium and manganese.

Butler in *J. Electrochem. Soc.*, 100:250 (1953) describes alkaline earth orthophosphate phosphors activated with tin or with tin and manganese. The tin-manganese coactivated phosphors disclosed by Butler employ a calcium orthophosphate host matrix modified by the incorporation of some strontium.

Koelmans et al. in *J. Electrochem. Soc.*, 104:442 (1957) discuss tin activated strontium orthophosphate phosphors modified by the incorporation of aluminum, cadmium, calcium, magnesium, or zinc.

Sarver et al. in *J. Electrochem. Soc.*, 108:1103 (1961) discuss phase equilibrium relationships and luminescence of tin activated strontium orthophosphate phosphors modified with calcium, magnesium, or zinc.

SUMMARY OF THE INVENTION

In one aspect of the invention, a luminescent phosphor composition consists essentially of a non-stoichiometric cerium and manganese coactivated modified alkaline earth orthophosphate represented by the formula:

$$Sr_{(3-v-w-x-y-z)}\square_v Mg_w Ca_x (PO_4)_2 : Ce_y Mn_z$$

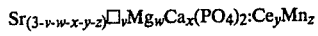

where $\square$ represents the non-stoichiometric factor and:
- $0.001 \leq v \leq 0.05$
- $0.180 \leq w \leq 0.35$
- $0 \leq x \leq 0.08$
- $0.015 \leq y \leq 0.05$
- $0.01 \leq z \leq 0.10$, the luminescent phosphor composition emitting red emission when excited, and characterized by extended fluorescence decay lifetime.

In another aspect of the invention, a fluorescent lamp having diminished flicker when operated on alternating current comprises, in combination, a sealed light-transmitting tubular envelope, a discharge sustaining filling contained within the envelope, electrodes disposed within said envelope and operable when energized to sustain a discharge therebetween to generate ultraviolet radiation including a substantial proportion of 254 nm radiation, and a phosphor coating disposed on the interior surface of said envelope, said phosphor coating including a composition consisting essentially of a non-stoichiometric cerium and manganese coactivated modified orthophosphate represented by the formula $$Sr_{(3-v-w-x-y-z)}\square_v Mg_w Ca_x (PO_4)_2 : Ce_y Mn_z$$

where $\square$ represents the non-stoichiometric factor and:
- $0.001 \leq v \leq 0.05$
- $0.180 \leq w \leq 0.35$
- $0 \leq x \leq 0.08$
- $0.015 \leq y \leq 0.05$
- $0.01 \leq z \leq 0.10$.

DESCRIPTION OF THE PREFERRED EMBODIMENTS

Phosphors in accordance with the invention consist essentially of a modified strontium orthophosphate host matrix coactivated by the incorporation of cerium and manganese ions. As used throughout this specification and claims, the term modified strontium orthophosphate means the normally less-stable high temperature crystalline modification of the compound, stabilized to room temperature by the addition of other alkaline earth cations. Pure strontium orthophosphate undergoes a rapid, reversible phase transition at 1305° C. between a high temperature and a low temperature crystalline modification. In phosphors in accordance with this invention, the host matrix consists essentially of the high temperature modification stabilized to room temperature by the incorporation of magnesium and calcium ions in the host lattice. Stabilization is achieved primarily by magnesium, with lesser amounts of calcium added to enhance the stabilizing effect of the magnesium.

The operable range of incorporation of magnesium into the strontium orthophosphate host for stabilization is between 0.18 and 0.35 atoms of magnesium per mole of alkaline earth orthophosphate. The preferred range of magnesium content for phosphor compositions of this invention is near the upper end of this range, preferably between about 0.25 and 0.35 atoms of magnesium per mole of alkaline earth orthophosphate. It has been found that, subject to variation in the manganese content, the emission intensity of phosphor compositions of this invention tends to fall off markedly as magnesium content is decreased.

Additional stabilization of the high temperature crystalline modification of strontium orthophosphate is achieved by the incorporation of small amounts of calcium ion, generally in the range below about 0.08 atoms per mole of alkaline earth orthophosphate.

Figure 1:
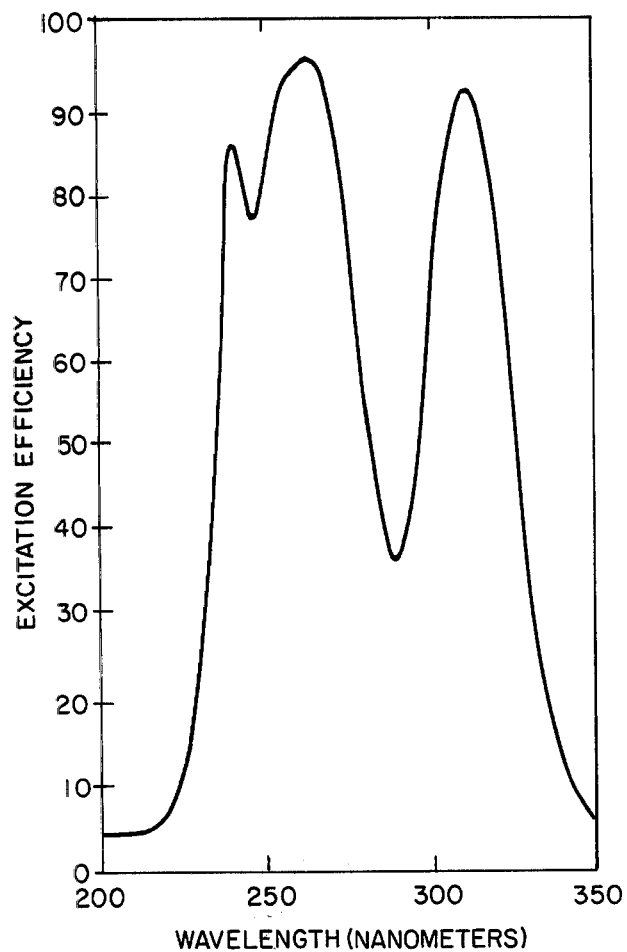
FIG. 1 shows the excitation spectrum for cerium in phosphor compositions in accordance with one aspect of the present invention.

As shown by the excitation spectrum in FIG. 1, in the host environment of the phosphor compositions of this invention, cerium has strong absorption bands at about 260 nm and at about 310 nm. These excitation bands are very close to the important emission at 254 nm and 313 nm of a low pressure mercury plasma source. Thus, cerium is eminently suited to absorb both the short and long wavelength radiation of excited low pressure mercury such as found in fluorescent lamps.

Moreover, the excitation spectrum for cerium emission and the excitation spectrum for manganese emission, when resolved and independently measured, are found to have the same shape. This demonstrates that cerium, in the phosphor compositions of the present invention, serves to effectively sensitize manganese.

The operable range of cerium content employed to sensitize manganese in phosphors of this invention is between about 0.015 and 0.05 atoms of cerium per mole of alkaline earth orthophosphate. The preferred range of cerium content to optimize the absorption and conversion of excitation energy is at the upper end of the operable range, between about 0.03 and 0.05 atoms of cerium per mole of alkaline earth orthophosphate.

Manganese incorporation into phosphor compositions according to this invention operably lies in the range between about 0.01 and 0.10 atoms of manganese per mole of alkaline earth orthophosphate. As illustrated by the data presented in the table below, to maximize the brightness of the excited phosphor composition, the manganese content is maximized near the upper end of the operable concentration range.

However, optimization of brightness at higher manganese levels also tends to shorten the decay lifetime of the excited phosphor. If it is desirable to lengthen the fluorescent decay lifetime of phosphors in accordance with this invention, lower concentrations of manganese are preferred, in the range from about 0.01 to about 0.08 atoms of manganese per mole of alkaline earth orthophosphate. Optimum fluorescent decay lifetimes are obtained when the manganese content is about 0.06 atoms per mole of orthophosphate.

Slow exponential decay of the red emission of phosphors according to this invention is ascribed to the high manganese ion site symmetry in the lattice provided by the host modified alkaline earth orthophosphate.

The slow exponential decay of these phosphors makes them useful in such applications as display and monitor cathode ray tubes, or the reduction or elimination of the visual appearance of flicker in fluorescent lamps operated on lower frequencies of alternating current such as the 50 Hz alternating current common in European countries.

To enable one skilled in the art to practice this invention, the following examples are provided. These examples are not to be viewed as limiting the scope of the present invention, but merely as illustrative thereof.

EXAMPLES

A series of cerium and manganese coactivated modified strontium orthophosphate phosphors having compositions in accordance with this invention were prepared. The components of the phosphor composition were thoroughly mixed by dry blending, and then fired for about two hours at 1100° C. under a flowing gas atmosphere of 10% hydrogen in nitrogen (5 L/min.) to assure that cerium is present substantially as $Ce^{3+}$.

Strontium was introduced as the monohydrogen phosphate and the carbonate. Magnesium, calcium, and manganese were introduced as the carbonates, cerium as $CeO_2$.

The nominal formula of each example is given in the Table. The non-stoichiometric factor was taken to be the difference between the sum of the cation content of each formulation, in atoms/mole, and the value 3. Ionic charge balance in the phosphors is probably maintained by the presence of some $Ce^{+4}$.

TABLE

| EX. | FORMULATION | Ce EMISSION (NORMALIZED) | Mn EMISSION (NORMALIZED) | REFLECTANCE (AT 254 nm) | Mn DECAY CONSTANT (msec) |
|---|---|---|---|---|---|
| I   | $Sr_{2.57}\square_{0.02}Mg_{0.21}Ca_{0.08}(PO_4)_2Ce_{0.037}Mn_{0.08}$ | 100 | 100 | 34% | 38 |
| II  | $Sr_{2.57}\square_{0.02}Mg_{0.25}Ca_{0.08}(PO_4)_2Ce_{0.02}Mn_{0.06}$ | 80 | 73 | 45% | 45 |
| III | $Sr_{2.57}\square_{0.02}Mg_{0.23}Ca_{0.08}(PO_4)_2Ce_{0.02}Mn_{0.08}$ | 36 | 44 | 41% | 35 |
| IV  | $Sr_{2.57}\square_{0.02}Mg_{0.21}Ca_{0.08}(PO_4)_2Ce_{0.02}Mn_{0.10}$ | 32 | 42 | 38% | 31 |

Figure 2:
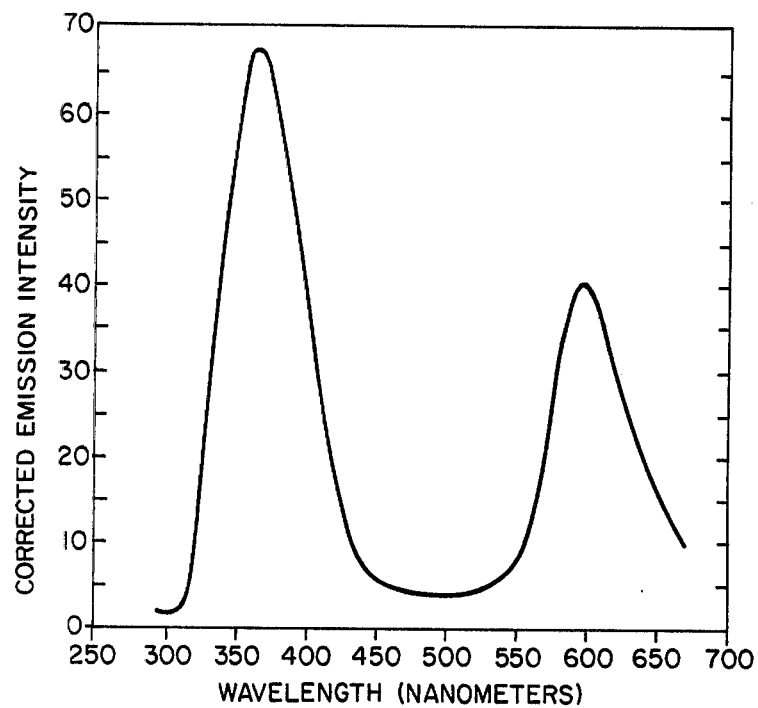
FIG. 2 shows the emission spectrum for phosphor compositions in accordance with one aspect of the present invention.

The emission spectrum of Example I, typical of the emission of phosphors in accordance with this invention, is shown in FIG. 2. Under ultraviolet excitation at 254 nm, the phosphor exhibited both cerium and manganese emission.

The cerium emission occurs in the long wavelength UV region, with a maximum at about 370 nm with an emission tail extending into the short wavelength visible blue region. The full width at half maximum (FWHM) for this emission was found to be 70 nm.

The manganese emission occurs at 610 nm in the red region of the visible spectrum and likewise was found to have a FWHM of 70 nm. The phosphor thus has a red emission, slightly augmented and modified by the small visible blue contribution of the cerium emission.

The emission and excitation spectra of the phosphors were measured with a Perkin Elmer MPF44A spectrofluorimeter and the decay of the emission was measured with PAR boxcar averagers, following dye laser excitation at 260 nm.

The spectral parameters in four of the materials measured are listed in the Table. The most intense emission, both in the $Ce^{3+}$ and $Mn^{2+}$ bands, is shown by Example I with highest Ce content of the materials listed.

The remaining three Examples with reduced cerium content ($2 \times 10^{-2}$ formula units) show a fast degradation of emission intensity with increasing Mn content and decreasing Mg content.

Even the best emitting material, Example I, showed fairly high reflectivity at 254 nm, namely 34%. This suggests that by increasing the $Ce^{3+}$ content in the lattice, it may be feasible to absorb and convert a larger fraction of the exciting UV radiation.

The longest decay constant (45 ms) was exhibited by Example II, the material with smallest Mn content ($6 \times 10^{-2}$ formula units). The decay constant gradually shortened with increasing Mn content, but still remained exceptionally long, in excess of 30 ms.

Visual observation of the Mn emission on raising the phosphor temperature above room temperature showed good thermal stability of the emission. This effect was quite pronounced for excitation in the long UV, at ~350 nm, and is due in part to a thermal spreading of the $Ce^{3+}$ excitation band to longer wavelengths at elevated temperatures.

Figure 3:
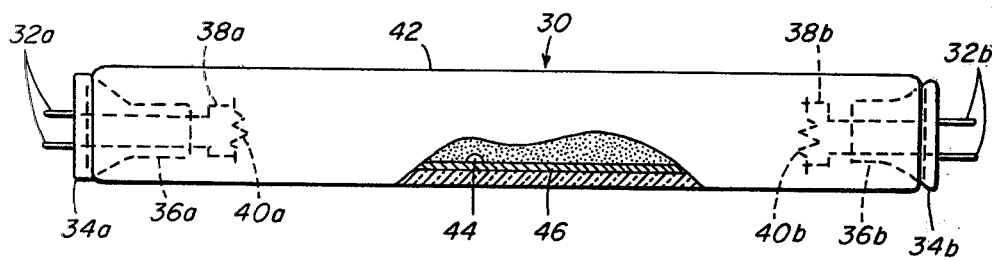
FIG. 3 is a lateral representation, partially cut-away, of a fluorescent lamp in accordance with another aspect of the present invention.

A second aspect of the present invention is illustrated in FIG. 3. A fluorescent lamp 30 comprises a transparent, light-transmitting sealed envelope 42, preferably glass. The envelope 42 is fitted at each end with mounts comprising electrodes 40a and 40b, re-entrant stem presses 36a and 36b and lead-in conductors 38a and 38b. Base caps 34a and 34b and pins 32a and 32b are provided at each end of the envelope 42, together with a small charge of mercury 44 within the envelope 42.

The inner surface of envelope 42 is coated with a phosphor layer 46 which includes the cerium-manganese coactivated modified strontium orthophosphate phosphor in accordance with this invention detailed above. The phosphor of this lamp has a sufficiently long decay lifetime to eliminate the visual appearance of flicker in the lamp, even when the lamp is operated on 50 Hz alternating current.

While there has been shown and described what are at present believed to be the preferred embodiments of the present invention, it will be obvious to those skilled in the art that various changes and modifications may be made therein without departing from the scope of the invention as defined by the appended claims.

What is claimed is:

1. A luminescent phosphor composition consisting essentially of a non-stoichiometric cerium and manganese coactivated modified alkaline earth orthophosphate represented by the formula:

$$Sr_{(3-v-w-x-y-z)}\square_v Mg_w Ca_x (PO_4)_2 : Ce_y Mn_z$$

wherein $\square$ represents the non-stoichiometry factor, and:
$0.001 \leq v \leq 0.05$
$0.18 \leq w \leq 0.35$
$0 \leq x \leq 0.08$
$0.015 \leq y \leq 0.05$
$0.01 \leq z \leq 0.10$
said luminescent phosphor composition emitting red emission when excited, and characterized by extended fluorescence decay lifetime.

2. A luminescent phosphor composition in accordance with claim 1 having an exponential decay constant of at least 30 milliseconds.

3. A luminescent phosphor composition in accordance with claim 1 wherein $0.03 \leq y \leq 0.05$.

4. A luminescent phosphor composition in accordance with claim 3 wherein $0.01 \leq z \leq 0.08$.

5. A luminescent phosphor composition in accordance with claim 4 wherein $0.25 \leq w \leq 0.35$.

6. A luminescent phosphor composition in accordance with claim 3 wherein z is 0.06.

7. A fluorescent lamp comprising:
a sealed light transmitting tubular envelope;
a discharge sustaining filling contained within said envelope;
electrodes disposed within said envelope and operable when energized to sustain a discharge therebetween to generate ultraviolet radiations including a substantial proportion of 254 nm radiations; and
a phosphor coating disposed on the interior surface of said envelope, said phosphor coating including a composition consisting essentially of a non-stoichiometric cerium and manganese coactivated modified alkaline earth orthophosphate represented by the formula:

$$Sr_{(3-v-w-x-y-z)}\square_v Mg_w Ca_x (PO_4)_2 : Ce_y Mn_z$$

wherein $\square$ represents the non-stoichiometric factor, and:
$0.001 \leq v \leq 0.05$
$0.18 \leq w \leq 0.35$
$0 \leq x \leq 0.08$
$0.015 \leq y \leq 0.05$
$0.01 \leq z \leq 0.10$.

8. A fluorescent lamp in accordance with claim 7 wherein $0.03 \leq y \leq 0.05$.

9. A fluorescent lamp in accordance with claim 8 wherein $0.01 \leq z \leq 0.08$.

10. A fluorescent lamp in accordance with claim 9 wherein $0.25 \leq w \leq 0.35$.

11. A fluorescent lamp in accordance with claim 8 wherein z is 0.06.

* * * * *